P. B. BATEMAN.
HARROW WEEDER.
APPLICATION FILED AUG. 5, 1910.
987,535.
Patented Mar. 21, 1911.
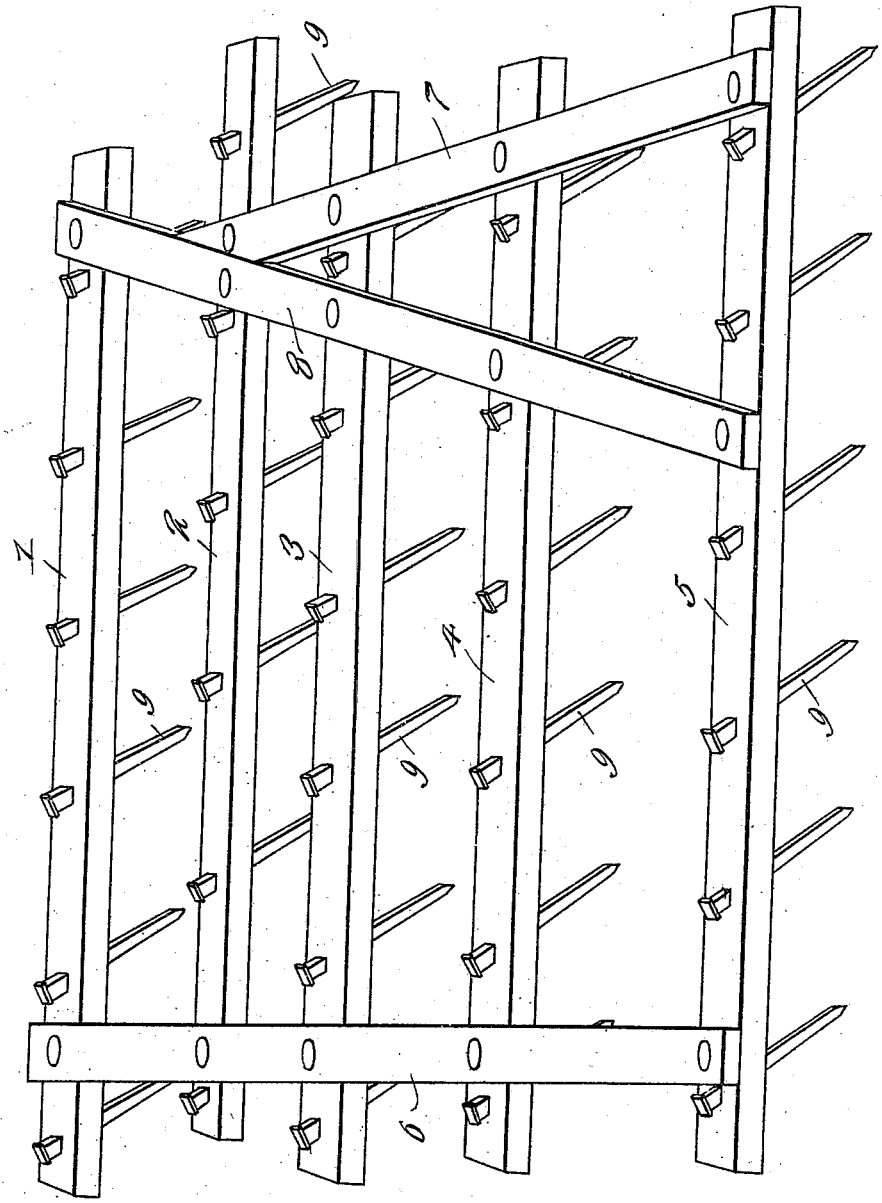
Inventor
Pliny B. Bateman
Witnesses
Frank B. Hoffman
C. C. Hines
By Victor J. Evans
Attorney

UNITED STATES PATENT OFFICE.

PLINY B. BATEMAN, OF DAYTON, WASHINGTON.

HARROW-WEEDER.

987,535.　　　　　Specification of Letters Patent.　　Patented Mar. 21, 1911.

Application filed August 5, 1910. Serial No. 575,658.

*To all whom it may concern:*

Be it known that I, PLINY B. BATEMAN, a citizen of the United States, residing at Dayton, in the county of Columbia and State of Washington, have invented new and useful Improvements in Harrow-Weeders, of which the following is a specification.

This invention relates to harrows, and particularly to harrows of the type adapted for both pulverizing the ground and removing weeds therefrom, the object of the invention being to provide a novel and simple construction of harrow which is effectually adapted for these purposes.

The invention consists of the features of construction, combination and arrangement of parts hereinafter fully described and claimed, reference being had to the accompanying drawing, showing a perspective view of my improved harrow.

Referring to the drawing, my improved harrow comprises a series of parallel transverse bars, of which any desired number may be used, and which are provided with teeth arranged in a prescribed manner. In the present instance, I have shown a series of five bars, 1, 2, 3, 4, and 5, which are of equal lengths but spaced varying distances apart and arranged in staggered relation and with their end portions out of alinement, as herein fully described. The bars are connected adjacent one end by a side bar 6 bolted or otherwise secured thereto, and near their opposite ends the bars 2, 3, 4, and 5, respectively are connected by a bar 7 arranged in parallel relation to the bar 6. The transverse bars are further connected by a coupling brace bar 8 secured to the said bars 2, 3, 4 and 5 inwardly of the bar 7 and extending forwardly at an outward angle connected at its forward end with the adjacent end of the bar 1 outwardly beyond the plane of the bar 7. The bar 8 thus acts as a diagonal brace as well as a connecting medium to coöperate with the bars 6 and 7 in holding the transverse bars firmly united.

Each transverse bar 1, 2, etc., is provided with a longitudinal series of harrow teeth 9. These teeth, of which an equivalent number are employed upon each transverse bar, pass downwardly through the respective bars at a lateral angle, being arranged preferably at an angle of 45 degrees to the vertical and extending obliquely toward one side of the frame of the harrow.

While the teeth are arranged equidistantly apart and accord in number upon the transverse bars, the latter are set relative to each other to so dispose the teeth that no more than two at any point will be arranged in a row or in alinement with each other. To secure this result, the transverse bars are not only spaced different distances apart, but are arranged with their ends out of alinement, so as to have a staggered relationship. For instance, the distance between the bars 1 and 2 in a harrow of ordinary size will be about eight inches, between the bars 2 and 3 about 5½ inches, between the bars 3 and 4 about 6 inches, between the bars 4 and 5 about 9½ inches. This arrangement spaces the bars a variable distance apart, so as to correspondingly vary the distance between adjacent teeth thereon. In addition, it will be observed that the transverse bars are alternately projected at opposite sides a greater or lesser distance from the central longitudinal line of the frame. Thus the bar 1 is set with its transverse center a little to the left of the center line of the frame, the bar 2 with its transverse center a little to the right of the longitudinal center line of the frame, while the bars 3, 4 and 5 are arranged similarly in regular order, their distance of extension, however, at one side or the other varying, as shown, so as to set the respective teeth thereof out of regular rows or regular order of relationship.

By the construction described, it will be seen that while the teeth of the transverse bars are correspondingly disposed upon their bars, thus making the bars duplex in construction with consequent economy of manufacture, the arrangement of the bars described disposes the transverse rows of teeth of the respective bars not only at variable distances apart, but also disposes the teeth in staggered relation from front to rear of the machine. Hence in the operation of the harrow the teeth will engage the surface of the earth on lines between each other and at variable distances to enable an effective crushing and pulverizing action to be obtained. Their disposition in such manner also provides for the more effective extraction of weeds, as a weed missed by any one tooth will be gathered and extracted by another. Furthermore, by arranging the teeth in the inclined position specified, the weeds are caused to wrap around or cling thereto, so that a weed will be extracted which would ordinarily be missed by a straight vertical tooth.

From the foregoing description, the construction and advantages of my improved harrow will be readily understood, as it will be seen that a harrow of the type described which possesses the stated advantages may be conveniently and economically manufactured.

Having thus fully described the invention what is claimed as new is:—

1. A harrow comprising a series of transverse parallel bars connected in variably spaced relation and set with their transverse centers alternately on opposite sides of the longitudinal central line of the harrow, said bars being provided with rows of teeth arranged by their described disposition in staggered order.

2. A harrow comprising a series of transverse parallel bars connected in variably spaced relation and set with their transverse centers alternately on opposite sides of the longitudinal central line of the harrow, said bars being provided with uniformly spaced rows of teeth inclined at an oblique angle laterally in one direction and disposed by the described arrangement of the bars in staggered order.

In testimony whereof I affix my signature in presence of two witnesses.

PLINY B. BATEMAN.

Witnesses:
W. G. SHEEHAN,
J. E. BUTLER.